(12) United States Patent
Jaeger

(10) Patent No.: US 8,789,229 B2
(45) Date of Patent: Jul. 29, 2014

(54) APPARATUS FOR CLEANING SURFACES

(76) Inventor: Anton Jaeger, Senden (DE)

( * ) Notice: Subject to any disclaimer, the term of this patent is extended or adjusted under 35 U.S.C. 154(b) by 273 days.

(21) Appl. No.: 13/272,256

(22) Filed: Oct. 13, 2011

(65) Prior Publication Data

US 2012/0090107 A1 Apr. 19, 2012

(30) Foreign Application Priority Data

Oct. 15, 2010 (DE) .......................... 10 2010 048 625

(51) Int. Cl.
*A46B 13/06* (2006.01)

(52) U.S. Cl.
USPC .................... 15/50.3; 15/21.1; 15/50.1; 15/24

(58) Field of Classification Search
CPC ......... A46B 13/06; A47L 9/04; A47L 9/0416
USPC ...................... 15/21.1, 24, 29, 50.1, 50.3, 387
See application file for complete search history.

(56) References Cited

U.S. PATENT DOCUMENTS

| | | | | |
|---|---|---|---|---|
| 1,209,722 A | * | 12/1916 | Kirby | 15/387 |
| 1,817,644 A | * | 8/1931 | Pope | 15/24 |
| 1,839,768 A | | 1/1932 | Major | |
| 3,869,746 A | * | 3/1975 | Man-king | 15/29 |
| 3,927,434 A | * | 12/1975 | Burgess | 15/24 |
| 4,374,444 A | | 2/1983 | Zhadanov | |
| 4,597,127 A | | 7/1986 | Swanson | |
| 5,007,127 A | | 4/1991 | Paolo | |
| 6,862,769 B1 | * | 3/2005 | Dalton, Sr. | 15/24 |
| 2003/0028982 A1 | | 2/2003 | Kress | |

FOREIGN PATENT DOCUMENTS

| | | | |
|---|---|---|---|
| DE | 26 56 255 A1 | 6/1978 | |
| DE | 2656255 A1 * | 6/1978 | ............ A46B 13/06 |
| DE | 33 31 402 A1 | 8/1983 | |
| DE | 20 2006 017 854 U1 | 2/2007 | |
| DE | 10 2009 008 001 U1 | 6/2009 | |
| DE | 10 2008 034 005 A1 | 1/2010 | |
| EP | 2147625 A1 | 1/2010 | |
| JP | 05023218 A * | 2/1993 | ............ A46B 13/06 |
| JP | 06121766 A * | 5/1994 | ............ A46B 13/06 |
| JP | 11-9524 * | 1/1999 | ............... A47L 9/04 |
| JP | 2000 219107 | 8/2000 | |
| JP | 2000219107 A * | 8/2000 | ............ A46B 13/06 |
| NL | 9 101 373 A | 3/1993 | |

OTHER PUBLICATIONS

JP05023218A (machine translation), 1993.*

(Continued)

*Primary Examiner* — Mark Spisich
*Assistant Examiner* — Andrew A Horton
(74) *Attorney, Agent, or Firm* — Gifford, Krass, Sprinkle, Anderson & Citkowski, P.C.

(57) ABSTRACT

An apparatus for cleaning surfaces has a cleaning head which includes a base part and at least two brush elements which are provided at opposite the sides of the base part and which can be set into a cleaning movement relative to the base part. A fluid drive is integrated into the base part and is designed to convert the flow energy of a fluid supplied to the base part under pressure into the cleaning movement of the brush elements. The fluid drive has a drive member, in particular a turbine wheel or a bucket wheel, which is driven by the fluid and by which both brush elements can be driven together.

5 Claims, 4 Drawing Sheets

(56) References Cited

OTHER PUBLICATIONS

DE2656255A1 (machine translation), 1978.*
JP11-9524 (Abstract), 1999.*

Translation of German Search Report dated Aug. 10, 2012 relating to DE 10 2010 048 625.6.
Translation of European Search Report dated Jan. 17, 2012 relating to EP Application No. 11185193.7-2318.

* cited by examiner

APPARATUS FOR CLEANING SURFACES

The present invention relates to an apparatus for cleaning surfaces.

Such apparatus are generally known and are used, for example, for cleaning solar collectors. A cleaning head having a base part and a brush element can be provided, with the brush element being able to be set into a cleaning movement relative to the base part. A fluid drive can be integrated into the base part and is designed to convert the flow energy of a cleaning fluid supplied to the base part under pressure into the cleaning movement of the brush element. The brush element can in particular be a cleaning roll which is rotatably supported at the base part and which is moved manually or automatically over the surface to be cleaned in the cleaning process while rotating continuously.

The costs and inherent weight of such an apparatus are, however, relatively high so that they are basically not particularly suitable either for private households or for cleaning solar collector surfaces which are as a rule inclined on building roofs in practice.

It is the object of the invention to provide an apparatus of the initially named kind which can be manufactured inexpensively with a reliable operation and which has an inherent weight which is as low as possible.

This object is satisfied by an apparatus having the features of claim 1.

In accordance with the invention, the cleaning head includes a base part and at least two brush elements provided at opposite sides of the base part. The fluid drive has a drive member, in particular a turbine wheel or a bucket wheel, which is directly driven by the fluid and by which both brush elements can be driven together. The invention thus makes it possible to drive two separate brush elements using only one single drive member and thus to sweep over a larger surface on the cleaning than on the use of a single brush element. In particular costs and weight can be saved by the omission of a second drive member.

Further developments of the invention are set forth in the dependent claims, in the description and in the enclosed drawings.

In accordance with an embodiment of the invention, the fluid drive includes a transmission unit having an inlet acted on by the fluid at the drive member and two outlets acting on the brush elements. The inlet and the two outlets can be arranged in T shape, for example, whereby a symmetrical overall construction of the cleaning apparatus results.

In accordance with a further embodiment of the invention, a transmission is provided for each brush element, with the transmissions being coupled to the common drive member at the inlet side. The transmissions enable an adaptation of the speed of rotation of the brush elements to the respective application by provision of a suitable transmission ratio.

The fluid drive can directly set the brush elements designed in roll form or the drive rollers for the brush elements into rotation. An individual turbine wheel can, for example, be coupled to two outlet elements which drive the brush elements or the drive rollers.

In accordance with a further embodiment, the fluid drive has a common fluid inflow, a means for branching off a supplied fluid flow into two opposite part flows and two fluid outflows provide at the opposite sides of the base part and leading to the respective brush elements. The part flows can thus be used to apply cleaning fluid to the brush elements from the inside. The brush elements can be provided for this purpose with suitable openings from which the fluid emerges during operation.

The invention will be described in the following by way of example with reference to the drawings.

Figure 1:
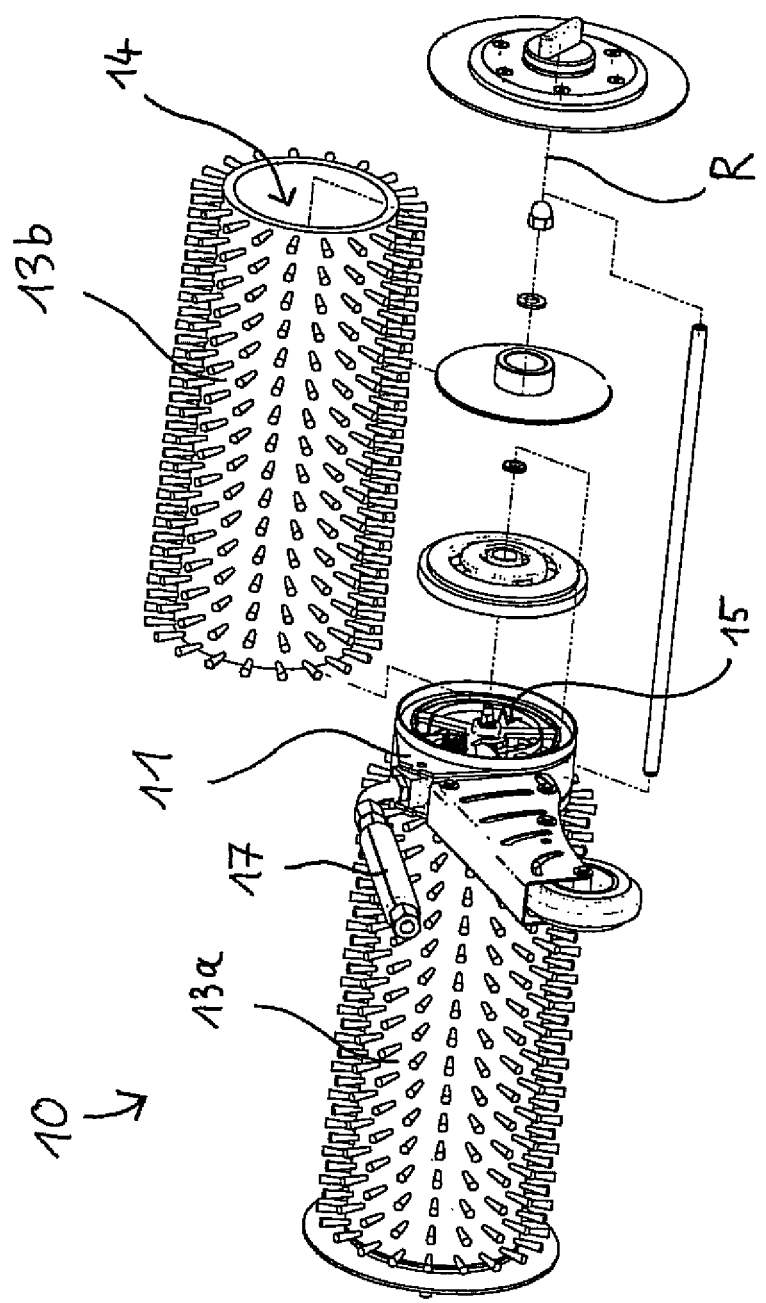
FIG. 1 shows a cleaning apparatus in accordance with a first embodiment of the invention.

The cleaning apparatus in accordance with the invention shown in FIG. 1 includes a cleaning head 10 having a base part 11 and two brush elements 13a, 13b provided at opposite sides of the base part 11. The brush elements 13a, 13b are here formed as cylindrical cleaning rolls which are rotatably supported about an axis of rotation R at the base part 11. A fitting, for example bristles, tailored to the respective cleaning purpose is provided at the peripheral surface of the brush elements 13a, 13b.

Figure 2:
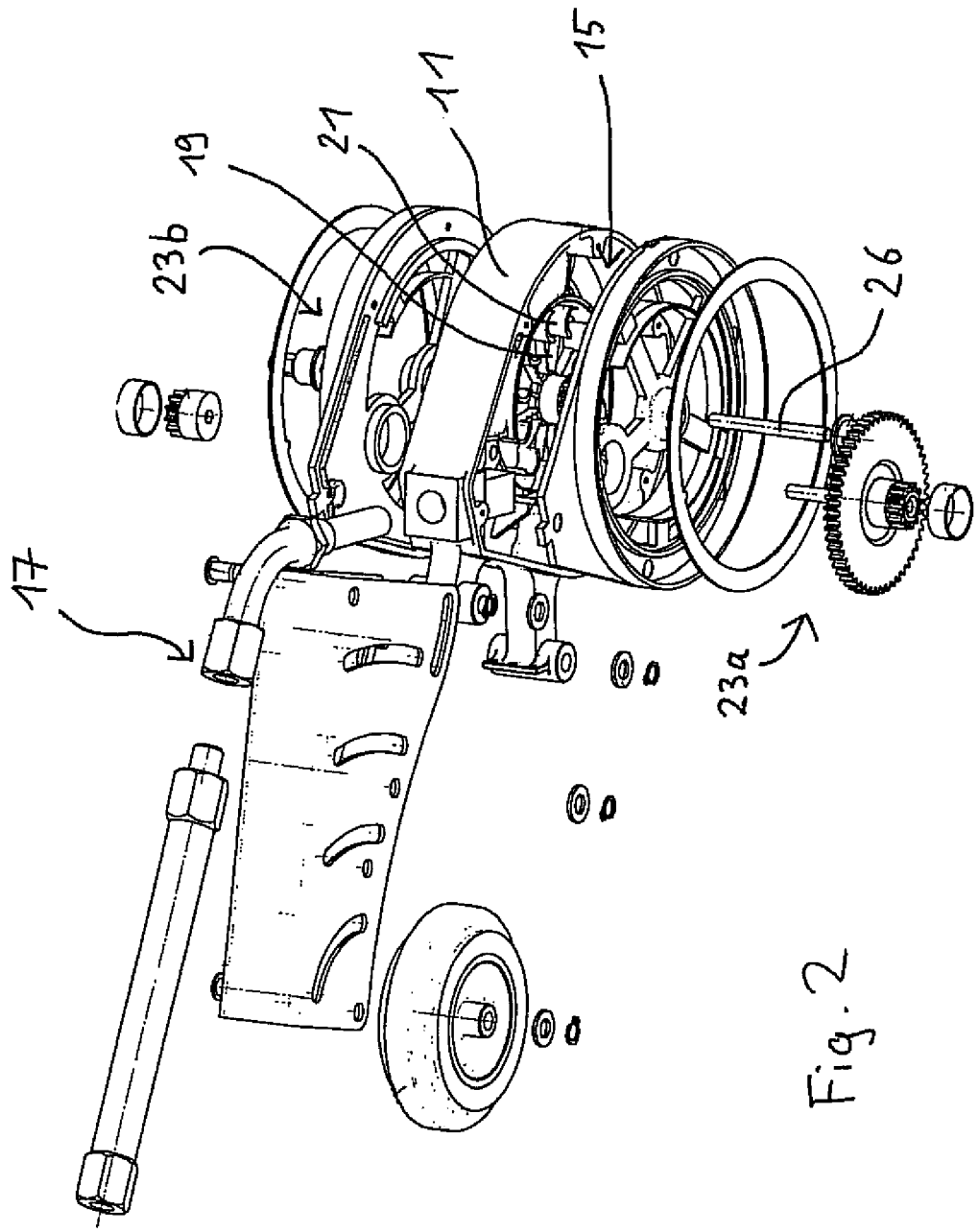
FIG. 2 is a part view of the apparatus in accordance with FIG. 1 in an exploded representation.
Figure 3:
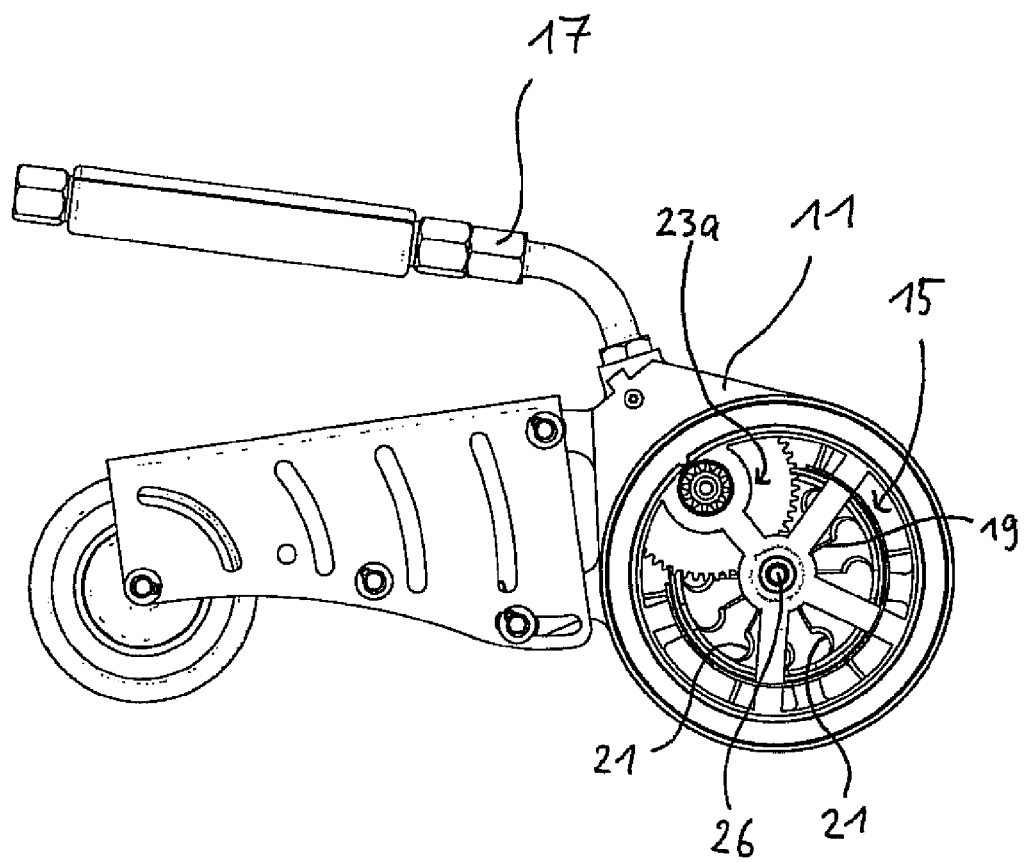
FIG. 3 is a side view of the apparatus in accordance with FIG. 1.

Pressurized cleaning fluid, in particular water, can be supplied to the base part 11 via a connector piece 17. In accordance with FIGS. 2 and 3, a turbine wheel 19 with buckets 21 is rotatably supported about the axis of rotation R in the housing-like base part 11 and is arranged such that the buckets 21 are acted on by the fluid flow entering into the base part 11 and the turbine wheel 19 is thus set into motion. Transmissions 23a, 23b are provided at both sides of the turbine wheel 19 and communicate a rotational movement of the turbine wheel 19 further to the respective brush element 13a, 13b. The transmission units 23a, 23b in this respect provide a desired transmission ratio for adapting the speeds of rotation of the brush elements 13a, 13b. In the embodiment shown, the two transmissions 23a, 23b are driven at the inlet side by the same drive shaft 26 on which the turbine wheel 19 is also seated.

During cleaning operation, the fluid flow entering into the base part 11 impacts the buckets 21 of the turbine wheel 19 and drives it. Subsequently, the fluid flow branches into two opposite part flows, passes through the transmissions 23a, 23b and moves into an inner hollow space 14 (FIG. 1) of the brush elements form which it emerges through suitable openings, not shown, and thus wets the surface to be cleaned. A high cleaning effect is thus achieved in conjunction with the rotating cleaning movement.

Figure 4:
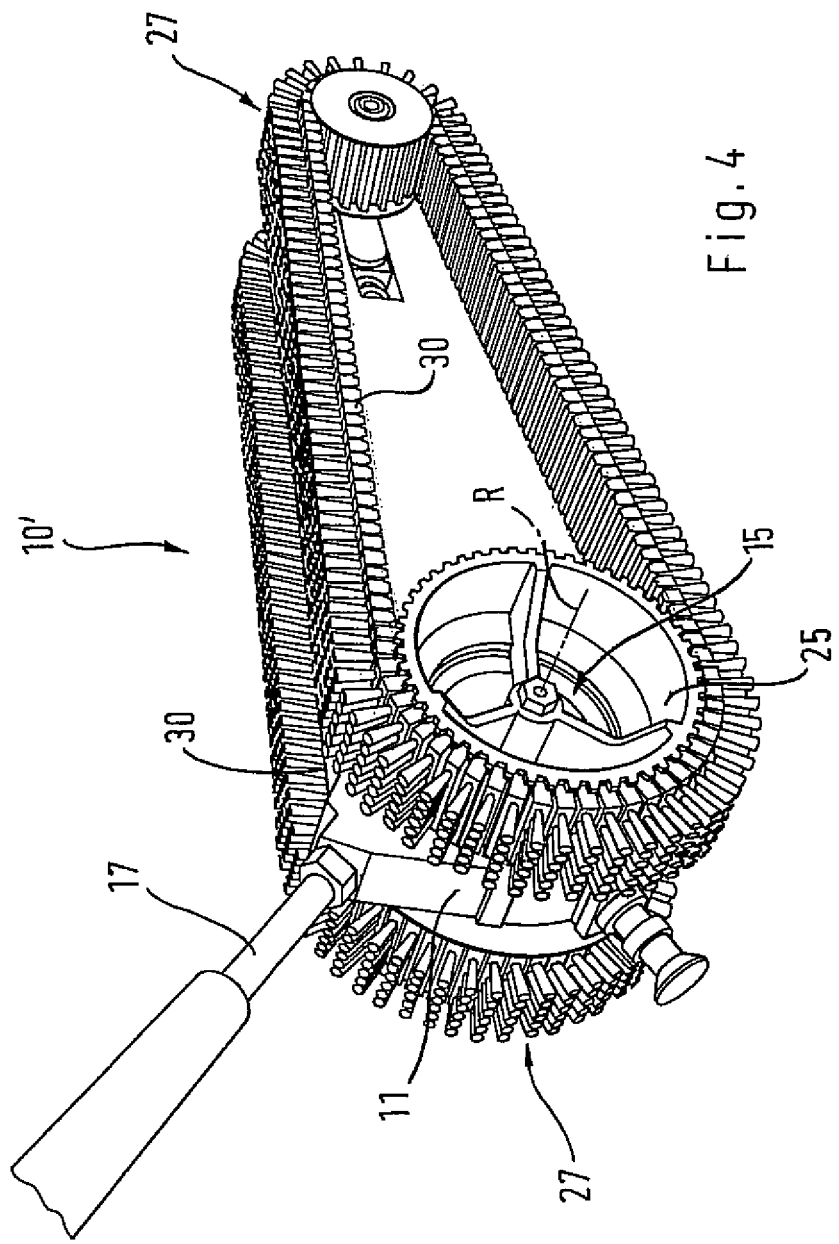
FIG. 4 shows a cleaning apparatus in accordance with a second embodiment of the invention.

FIG. 4 shows an alternative embodiment of the invention. The cleaning head 10' is designed here such that the fluid drive 15 drives, instead of cylindrical cleaning rolls, two drive rollers 25 which are associated with respective belt drive arrangements 27. The belt drive arrangements 27 each have a bristled belt 30 which forms the brush element in this embodiment. The belts 30 are set into a peripheral cleaning movement by the rotating drive rollers 25.

Apart from the two disclosed embodiments, different further brush elements which can be set into cleaning movement, e.g. vibrating or shaking brushes, are conceivable. Independently of the kind of cleaning movement, a single drive member, however, provides the drive of two brush elements arranged at opposite sides of a base part. The invention thus makes possible an effective cleaning of solar collectors with a low cost effort and with a relatively small inherent weight.

REFERENCE NUMERAL LIST 10, 10' cleaning head
11 base part
13a, 13b brush element
15 fluid drive 17 connector piece
19 turbine wheel
21 bucket
23a, 23b transmission
25 drive roller
26 drive shaft
27 belt drive arrangement
30 belt
R axis of rotation

The invention claimed is:

1. An apparatus for cleaning surfaces, having a cleaning head (10, 10') which includes a base part (11) and at least two brush elements (13a, 13b, 30) which are provided at opposite sides of the base part (11) and also supported by the base part and which can be set into a cleaning movement relative to the base part (11),
  wherein a fluid drive (15) is integrated into the base part (11) which is designed to convert the flow energy of a fluid supplied under pressure to the base part (11) into the cleaning movement of the brush elements (13a, 13b, 30); and
  wherein the fluid drive (15) has a drive member (19) which is rotatably driven about an axis by the fluid and by which both brush elements (13a, 13b, 30) can be driven together, said brush elements positioned on opposite axial ends of said drive member,
  wherein the fluid drive (15) includes a transmission unit having an inlet acted on by the fluid at the drive member (19) and two outlets acting on the brush elements (13a, 13b, 30).

2. An apparatus in accordance with claim 1, wherein the drive member (19) is either of a turbine or a bucket wheel.

3. An apparatus in accordance with claim 1, wherein one transmission unit (23a, 23b) is provided for each brush element (13a, 13b), with the transmission units (23a, 23b) being coupled at the inlet side to the common drive member (19).

4. An apparatus in accordance with claim 1, wherein the fluid drive (15) directly sets the brush elements (13a, 13b) designed in roll form or drive rollers (25) for the brush elements (30) into rotation.

5. An apparatus in accordance with claim 1, wherein the fluid drive (15) has a common fluid inflow, a means for branching off a supplied fluid flow into two opposite part flows and two fluid outflows provided at the opposite sides of the base part (11) and leading to the respective brush elements (13a, 13b).

* * * * *